US012572059B2

(12) United States Patent
Yamana

(10) Patent No.: US 12,572,059 B2
(45) Date of Patent: Mar. 10, 2026

(54) IMAGE PICKUP APPARATUS

(71) Applicant: CANON KABUSHIKI KAISHA, Tokyo (JP)

(72) Inventor: Kazuaki Yamana, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 18/583,682

(22) Filed: Feb. 21, 2024

(65) Prior Publication Data

US 2024/0295796 A1 Sep. 5, 2024

(30) Foreign Application Priority Data

Mar. 2, 2023 (JP) .................................. 2023-031901

(51) Int. Cl.
*G03B 17/12* (2021.01)
*G02B 7/00* (2021.01)

(52) U.S. Cl.
CPC ............. *G03B 17/12* (2013.01); *G02B 7/006* (2013.01); *G03B 2205/0053* (2013.01)

(58) Field of Classification Search
CPC .. G03B 11/00–06; G03B 17/12; G02B 7/006; H04N 23/55
See application file for complete search history.

(56) References Cited

U.S. PATENT DOCUMENTS

| | | | | |
|---|---|---|---|---|
| 8,331,047 B2 * | 12/2012 | Hung | ..................... | G02B 7/006 |
| | | | | 359/889 |
| 8,903,236 B2 * | 12/2014 | Subratie | ............... | G03B 17/566 |
| | | | | 396/544 |
| 11,503,191 B2 * | 11/2022 | Fujiwara | ................ | H04N 23/54 |

FOREIGN PATENT DOCUMENTS

| | | | | |
|---|---|---|---|---|
| CN | 117075414 A | * | 11/2023 | ............. G03B 13/36 |
| JP | 6794600 B2 | | 12/2020 | |

* cited by examiner

*Primary Examiner* — Leon W Rhodes, Jr.

(74) *Attorney, Agent, or Firm* — Cowan, Liebowitz & Latman, P.C.

(57) ABSTRACT

An image pickup apparatus includes an image sensor, an optical filter, a holder configured to hold the optical filter, a driving unit configured to move the holder, and a first elastic member disposed outside an imaging range. The driving unit moves the optical filter between a first position inserted into the imaging range and a second position retracted from the imaging range. The first elastic member comes into contact with at least a portion of a first surface of the optical filter, in a case where the optical filter moves from the first position to the second position, or in a case where the optical filter moves from the second position to the first position.

11 Claims, 6 Drawing Sheets

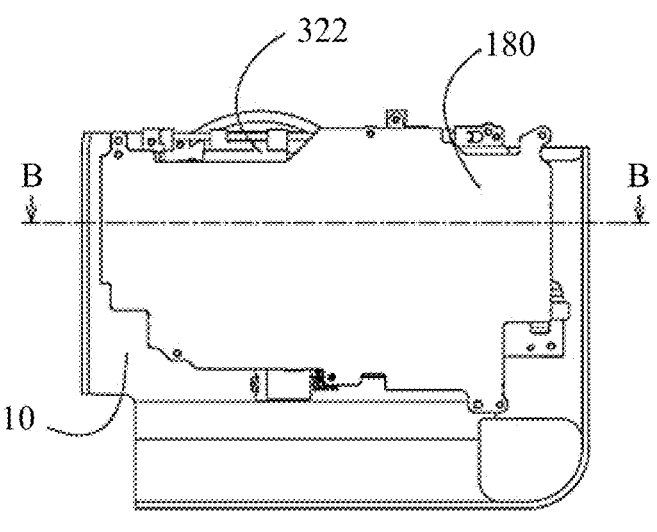
FIG. 6A
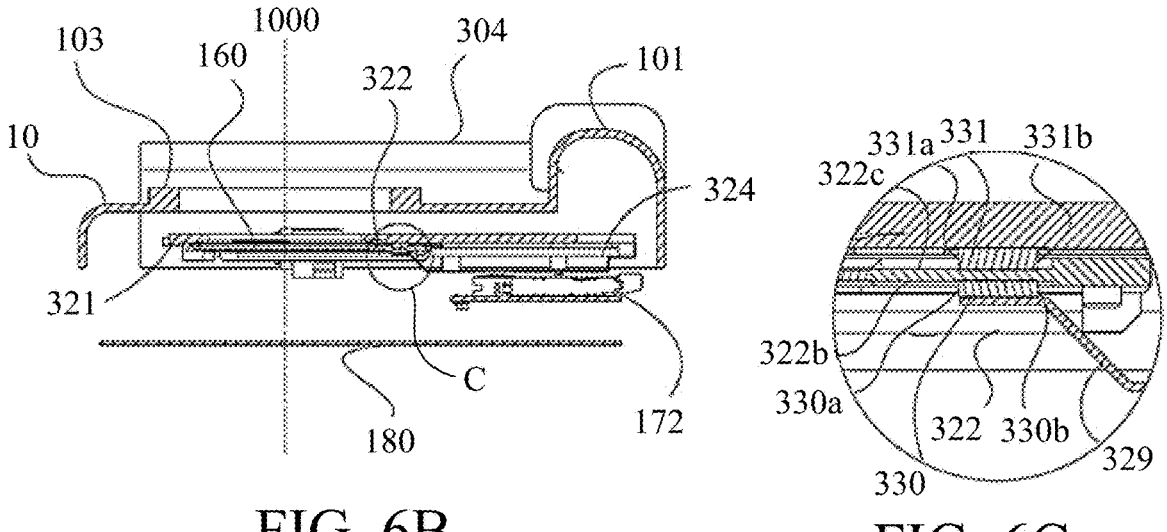
FIG. 6B
FIG. 6C
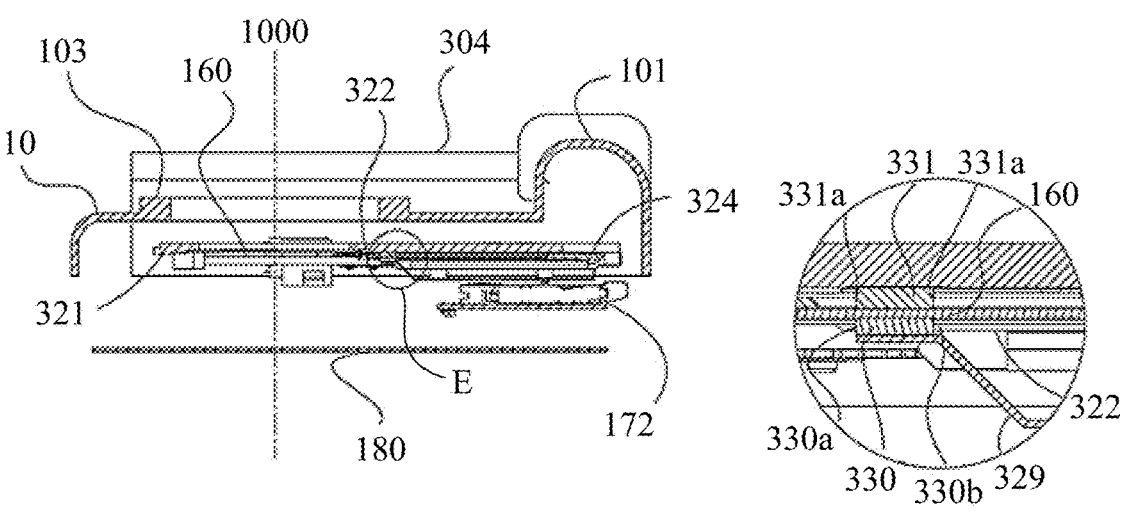
FIG. 6D
FIG. 6E

IMAGE PICKUP APPARATUS

BACKGROUND

Technical Field

One of the aspects of the embodiments relates to an image pickup apparatus.

Description of Related Art

Some conventional image pickup apparatuses can image an object using an optical filter such as a light attenuating filter (neutral density (ND) filter). Japanese Patent No. 6794600 discloses an image pickup apparatus including a plurality of ND filters movable upward and downward.

The image pickup apparatus disclosed in Japanese Patent No. 6794600 requires space for the optical filter to move upward and downward, and causes a large size of the image pickup apparatus. Moreover, the image pickup apparatus disclosed in Japanese Patent No. 6794600 must be disassembled to clean the optical filter if foreign substances such as dust are attached to the optical filter while the optical filter is driven. The foreign substances attached to the optical filter may appear in a captured image, and cause the captured image to be unusable.

SUMMARY

An image pickup apparatus according to one aspect of the disclosure includes an image sensor, an optical filter, a holder configured to hold the optical filter, a driving unit configured to move the holder, and a first elastic member disposed outside an imaging range. The driving unit moves the optical filter between a first position inserted into the imaging range and a second position retracted from the imaging range. The first elastic member comes into contact with at least a portion of a first surface of the optical filter, in a case where the optical filter moves from the first position to the second position, or in a case where the optical filter moves from the second position to the first position.

Further features of various embodiments of the present disclosure will become apparent from the following description of exemplary embodiments with reference to the attached drawings.

BRIEF DESCRIPTION OF THE DRAWINGS

FIGS. 6A to 6E explain a biasing relationship among the optical filter, an optical filter holder, and an elastic member in this embodiment.

DESCRIPTION OF THE EMBODIMENTS

Figure 1A:
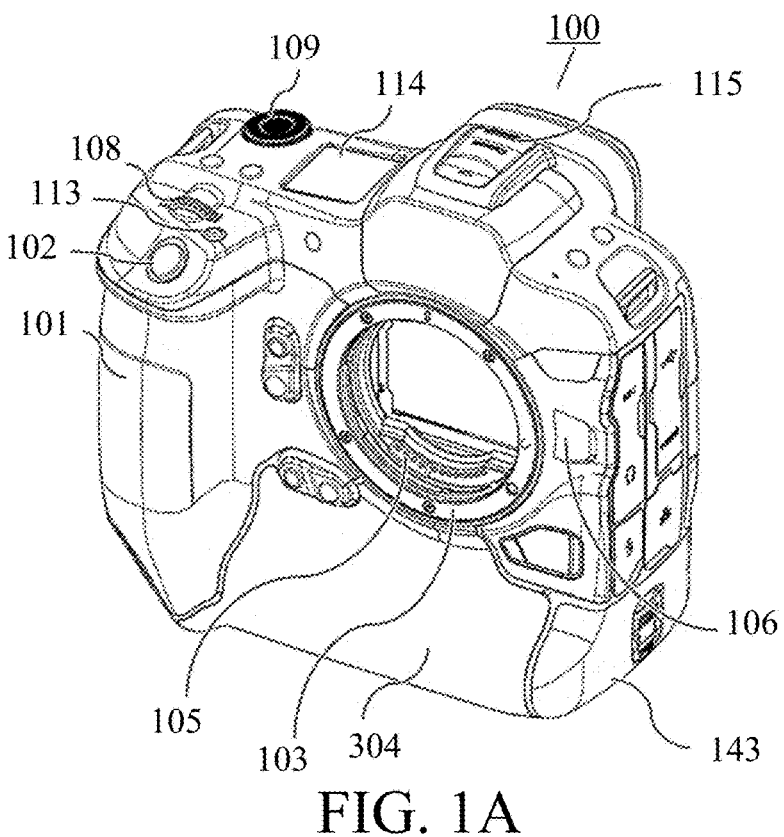
FIGS. 1A and 1B are external perspective views of an image pickup apparatus according to this embodiment.

Referring now to the accompanying drawings, a detailed description will be given of an embodiment according to this disclosure. In this embodiment, the same element will be designated by the same reference numeral. The following embodiment is one example, which may be suitably modified or changed depending on the configuration of an apparatus to which this embodiment is applied or on various conditions, and this embodiment is not limited to the following example. Portions of the embodiment may be suitably combined and configured.

Figure 1B:
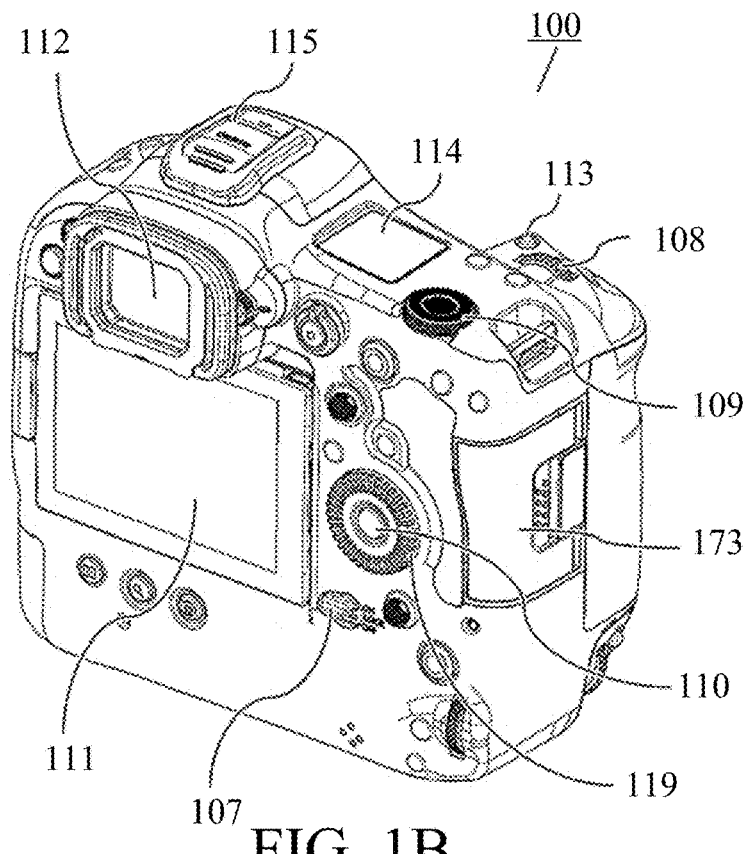

Referring now to FIGS. 1A and 1B, an image pickup apparatus (camera body) 100 according to this embodiment will be described. FIGS. 1A and 1B are external perspective views of the image pickup apparatus 100. FIG. 1A is an external perspective view of the image pickup apparatus 100 viewed from a front surface side, illustrating a state where a lens unit (exchangeable lens) 104 (refer to FIG. 2) attachable to the image pickup apparatus 100 is detached. FIG. 1B is an external perspective view of the image pickup apparatus 100 viewed from a rear surface side. This embodiment will discuss an image pickup system where the lens unit 104 is attachable to and detachable from the image pickup apparatus (camera body) 100, but is not limited to this example, and can also be applied to an image pickup apparatus where a camera body and a lens unit are integrated.

The image pickup apparatus 100 has a grip portion (holding portion) 101 to be held by a user for the user to stably hold the image pickup apparatus 100. On an upper portion of the grip portion 101, a shutter button 102 that is a switch for starting imaging an object is provided. The image pickup apparatus 100 has a grip portion (holder) 304 so that the image pickup apparatus 100 can be held in a different direction from the grip portion 101. On a front surface of the image pickup apparatus 100, a mount unit (lens mount) 103 is provided, and the lens unit 104 is attachable to and detachable from the image pickup apparatus 100 through the mount unit 103. A mount contact 105 is electrically connected between the image pickup apparatus 100 and the lens unit 104, supplies electric power to the lens unit 104, and performs communication regarding lens control and lens data by electric signals. In exchanging the lens unit 104, pressing a lens lock releasing button 106 provides unlock, and causes the lens unit 104 to be detached.

A power switch 107 is used to power on and off the image pickup apparatus 100. A main electronic dial 108 and a sub electronic dial 119 are rotationally operating members rotatable clockwise and counterclockwise, and by a rotational operation, various set values such as an aperture value (F-number) and a shutter speed can be changed. A mode switch dial 109 is an operation unit for switching an imaging mode, and is used for switching various modes such as a shutter speed priority imaging mode, an aperture priority imaging mode, a moving image capturing mode, and the like. A set button 110 is a push-button that is used mainly to determine a selection item.

A liquid crystal monitor 111 displays various setting screens of the image pickup apparatus 100, captured images, and live-view images. An electronic viewfinder 112 is an eyepiece viewfinder and displays various setting screens of the image pickup apparatus 100, a captured image, and a live-view image. A multifunction button 113 is a push-button, and the user can freely allot and use switching of various settings regarding imaging an object. A display panel 114 displays various setting states of the image pickup apparatus 100 such as an imaging mode and ISO speed. The display panel 114 is displayed even when the image pickup apparatus 100 is powered off.

An accessory shoe 115 has an accessory contact point 116 (refer to FIG. 2), so that various accessories such as an external flash, a microphone, and the like, can be attached thereto. A medium slot cover 173 can be opened and closed, and in an open state, an external recording medium (recording medium) 148 (see FIG. 3) such as an SD card, and the like, can be inserted into and extracted from a media slot (recording medium inserting portion) 172 (see FIG. 3) inside it.

Figure 2:
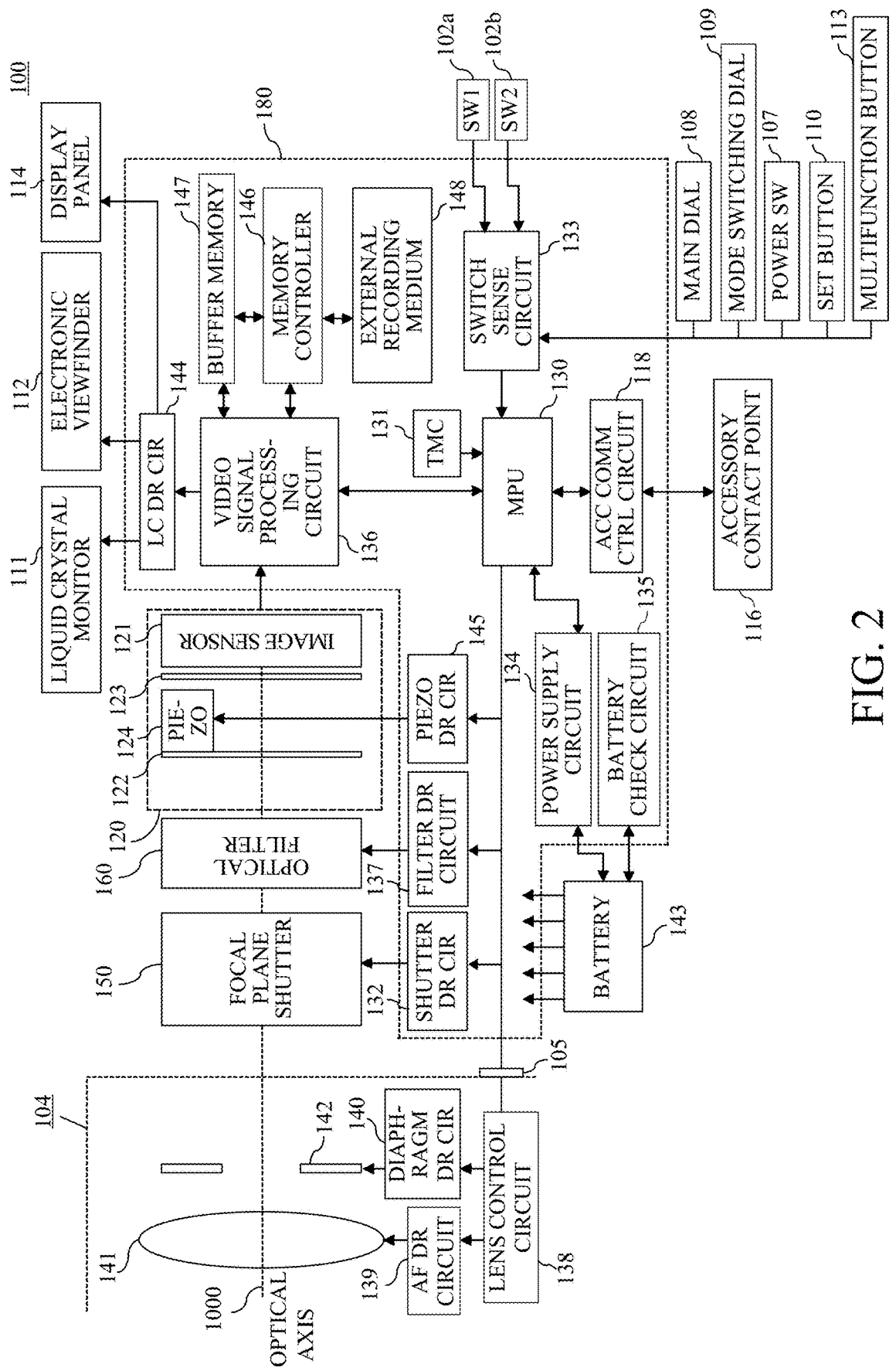
FIG. 2 is a block diagram of the image pickup apparatus according to this embodiment.

Referring now to FIG. 2, an electrical configuration and an operation of the image pickup apparatus 100 will be described. FIG. 2 is a block diagram of the image pickup apparatus 100 in which the lens unit 104 is attached. Elements common to those in FIG. 1 are designated by the same reference numerals.

An MPU 130 is a small central processing unit (control unit) built in the image pickup apparatus 100. Connected to the MPU 130 are a clock measuring circuit 131, a shutter driving circuit 132, a switch sensing circuit 133, a power supply circuit 134, a battery checking circuit 135, an image (video) signal processing circuit 136, an optical filter driving circuit 137, and a piezoelectric element driving circuit 145. The MPU 130 controls the operation of the image pickup apparatus 100, and performs processing of input information, instructions and control for each element. The MPU 130 has an EEPROM, and can store clock information and each piece of setting information by the clock measuring circuit 131.

The MPU 130 communicates with a lens control circuit 138 built in the lens unit 104 through the mount contact 105. Thereby, the MPU 130 can control the operation of each of a focus lens 141 and an electromagnetic driving aperture (aperture stop) 142 through an AF driving circuit 139 or an aperture driving circuit 140. FIG. 2 schematically illustrates a single focus lens 141 as an image pickup optical system of the lens unit 104, but the image pickup optical system actually includes a plurality of lens units.

The AF driving circuit 139 is connected, for example, to a stepping motor (not illustrated), and drives the focus lens 141. The MPU 130 calculates a focus lens driving amount in accordance with a defocus amount detected by using a focus signal read out of an image sensor 121, and transmits a focus instruction including the focus lens driving amount to the lens control circuit 138. The lens control circuit 138 that has received the focus instruction controls the driving of the focus lens 141 through the AF driving circuit 139. Thereby, autofocus (AF) is performed.

The aperture driving circuit 140 is connected to an aperture actuator such as the stepping motor (not illustrated), and drives a plurality of unillustrated aperture blades forming an aperture in the electromagnetic driving aperture stop 142. Driving the plurality of aperture blades can change an aperture size (aperture diameter) and adjust a light amount.

The MPU 130 calculates an aperture driving amount of the electromagnetic driving aperture stop 142 from a luminance signal read out of the image sensor 121, and transmits an aperture instruction including the aperture driving amount to the lens control circuit 138. In other words, the MPU 130 communicates with the lens control circuit 138 so as to control the electromagnetic driving aperture stop 142. The lens control circuit 138 that has received the aperture instruction controls the driving of the electromagnetic driving aperture stop 142 through the aperture driving circuit 140. Thereby, a proper aperture value (F-value) is automatically set.

A mechanical focal plane shutter 150 is driven by the shutter driving circuit 132. During imaging, a front curtain shutter (not illustrated) is moved so as to open a shutter from the time when the user presses down the shutter button 102, and in accordance with a desired exposure time, a rear curtain shutter (not illustrated) is moved so as to close the shutter, whereby the exposure time to the image sensor 121 is controlled.

The optical filter 160 is an optical element that diffuses incident light, or attenuates a certain wavelength range, whereby provides a special effect to an image. As the optical filter 160, an ND filter that attenuates an incident light amount by a prescribed rate, a Polarized Light (PL) filter that suppresses reflected light by using a polarizing film, a soft filter that performs soft expressions by diffusing light, and the like, may be mentioned, however, the optical filter 160 is not limited to this example. The optical filter 160 is driven by the optical filter driving circuit 137, and the position of the optical filter 160 can be moved. A detailed configuration of the optical filter 160 will be described below.

An imaging unit 120 is configured mainly by an optical low-pass filter 122, an optical low-pass filter holder 123, a piezoelectric element (piezoelectric member) 124, and the image sensor 121, which are unitized. The image sensor 121 performs a photoelectric conversion for an object image (optical image) formed through the lens unit 104. In this embodiment, the image sensor 121 is a Complementary Metal-Oxide-Semiconductor (CMOS) sensor, however, the image sensor 121 is not limited to this example. The image sensor 121 may use a Charge-Coupled Device (CCD) sensor, a Charge Injection Device (CID) sensor, and the like. The optical low-pass filter 122 arranged on a front side of the image sensor 121 is one sheet of birefringence plate formed of quartz, and has a rectangular shape. The piezoelectric element 124 is a single-plate piezoelectric element, and is vibrated by the piezoelectric element driving circuit 145 that has received instruction from the MPU 130, and to transmit the vibration to the optical low-pass filter 122. This vibration can shake off fine dust attached to the optical low-pass filter 122.

The image signal processing circuit 136 performs entire image processing such as filter processing, data compression processing, and the like, for electric signals obtained from the image sensor 121. Image data for monitor display from the image signal processing circuit 136 is displayed on the liquid crystal monitor 111 and the electronic viewfinder 112 through a liquid crystal driving circuit 144. The image signal processing circuit 136 can also save image data in a buffer memory 147 through a memory controller 146 in accordance with an instruction of the MPU 130. The image signal processing circuit 136 can also perform image data compression processing for image data such as JPEG, and the like. In a case where imaging is performed sequentially such as consecutive imaging, and the like, image data is temporarily stored in the buffer memory 147, and unprocessed image data can be sequentially read out through the memory controller 146. Thereby, the image signal processing circuit 136 can sequentially perform image processing and compression processing regardless of a speed of input image data.

The memory controller 146 has a function of storing image data in an external recording medium 148 and a function of reading out the image data stored in the external recording medium 148. The external recording medium 148 is an SD card, a CF card, and the like, attachable to and detachable from the image pickup apparatus 100, but the external recording medium 148 is not limited to the same.

The switch sensing circuit 133 transmits an input signal in accordance with the operation state of each switch to the MPU 130. A switch SW1 (102*a*) is put on by a first stroke (half press) of the shutter button 102. A switch SW2 (102*b*)

is put on by a second stroke (full press) of the shutter button 102. When the switch SW2 (102*b*) is turned on, an instruction to starting imaging is transmitted to the MPU 130. Connected to the switch sensing circuit 133 are the main electronic dial 108, the mode switch dial 109, the power switch 107, the set button 110, the multifunction button 113, and the like.

The MPU 130 performs information communication so as to use a function of an unillustrated accessory unit through the accessory contact point 116 by an accessory communication control circuit 118. The power supply circuit 134 distributes and supplies electric power of a battery (electric battery) 143 to each element of the image pickup apparatus 100. The battery 143 is connected to the battery checking circuit 135, which transmits remaining level information about the battery 143, and the like, to the MPU 130.

Figure 3:
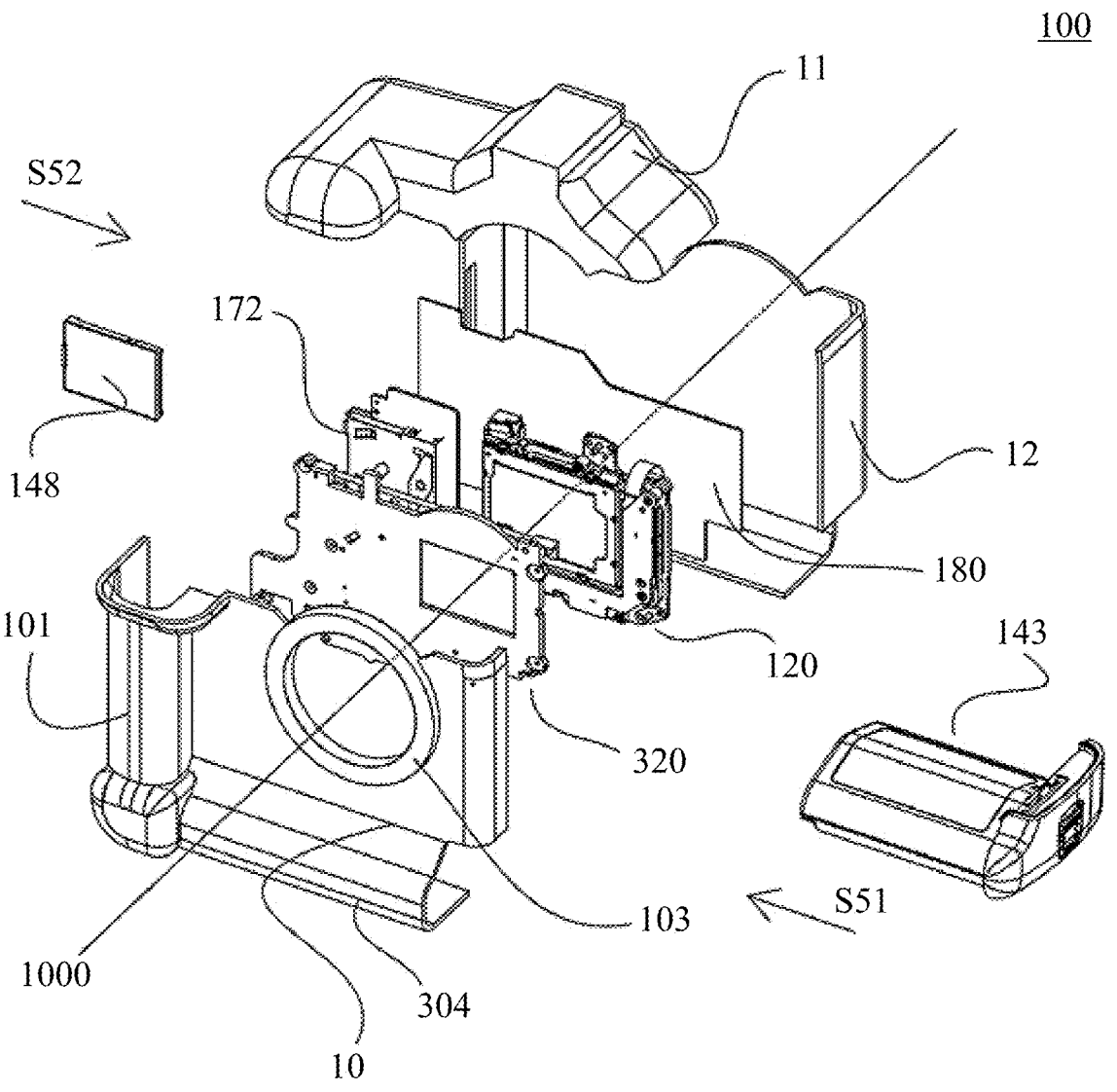
FIG. 3 is an exploded perspective view of the image pickup apparatus according to this embodiment.

Referring now to FIG. 3, a description will be given of the internal configuration of the image pickup apparatus 100. FIG. 3 is an exploded perspective view of the image pickup apparatus 100. An exterior of the image pickup apparatus 100 is configured mainly by a front cover 10, a top cover 11, and a rear cover 12. The battery 143 is disposed on a lower portion of the image pickup apparatus 100, and can be inserted and extracted in a direction of an arrow S51. The external recording medium 148 can be inserted into the media slot 172 provided in a side surface portion of the image pickup apparatus 100 in a direction of an arrow S52. The media slot 172 has a push-type lever, and by pressing down the lever, the external recording medium 148 can be attached and detached. On an optical axis 1000, the mount unit 103 and the imaging unit 120 are provided, and in the middle thereof (between the mount unit 103 and the imaging unit 120), an optical filter unit 320 is arranged. The optical filter 160 held by the optical filter unit 320 is an ND filter, a low-pass filter, or the like, however, the optical filter 160 is not limited thereto, and may be other optical members. The image pickup apparatus 100 is normally operable even in a state where the optical filter 160 is not inserted.

Figure 4:
FIG. 4 is an exploded perspective view of an optical filter unit according to this embodiment.
Figure 4:
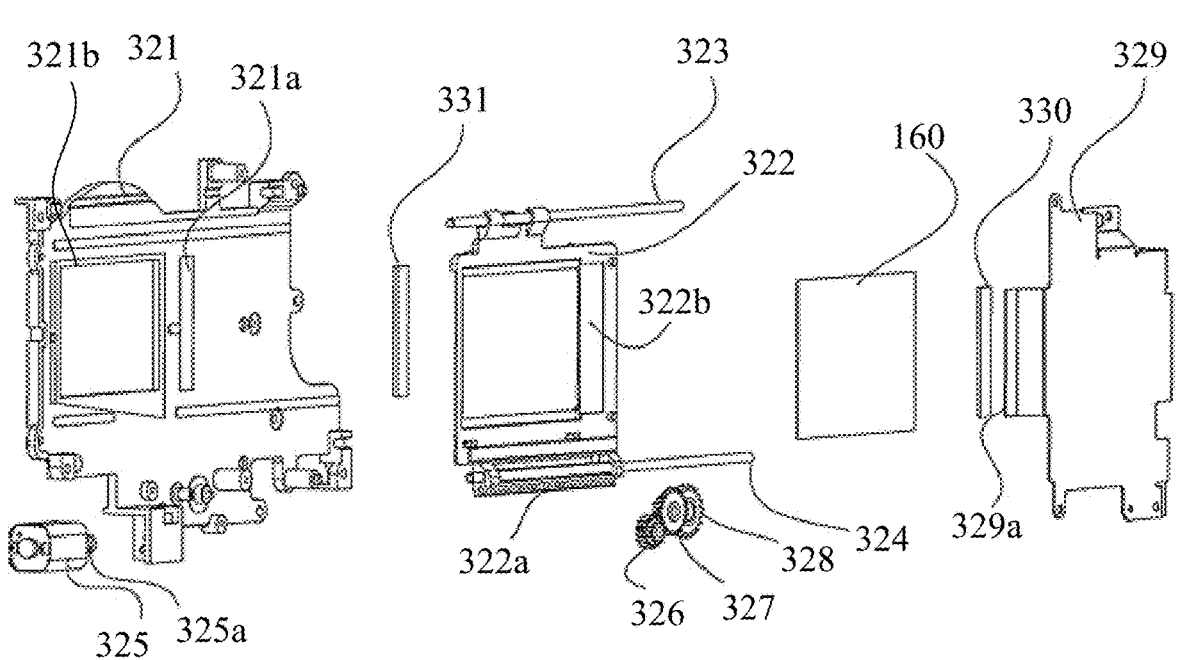

Referring now to FIG. 4, a description will be given of the configuration of the optical filter unit 320. FIG. 4 is an exploded perspective view of the optical filter unit 320. Each component that configures the optical filter unit 320 is attached to a base member 321. In the base member 321, an opening 321*b* provided inside the mount unit 103 is formed. The opening 321*b* defines an imaging range (imaging optical path). An optical filter holder 322 is a holder configured to hold the optical filter 160. The optical filter holder 322 has a rack gear forming portion 322*a*. The optical filter holder 322 is engaged with an upper portion rail 323 and a lower portion rail 324 that are guide members, and can drive the optical filter 160 in a specific direction.

A plate spring member 329 is attached to the base member 321 by a screw (not illustrated). At an adhering portion 329*a* of the plate spring member 329, an elastic member (first elastic member) 330 is adhered by a double-sided tape, and the like, so as to be fixed. The elastic member 330 is attached to the plate spring member 329 as described above. An elastic member (second elastic member) 331 is adhered to an adhering portion 321*a* of the base member 321 by a double-sided tape, and the like, and is disposed on an opposite side of the elastic member 330 with the optical filter 160 sandwiched between them (an opposite side of the elastic member 330 with respect to the optical filter 160). The elastic members 330 and 331 are disposed so that an opposite surface of each adhering surface comes into contact with plane portions 322*b* and 322*c* (FIG. 6C) of the optical filter 160 or the optical filter holder 322.

Disposed on the lower side of FIG. 4 is a motor (actuator, driving unit) 325 that drives (moves) the optical filter 160, and a pinion gear 325*a* is attached to a driving shaft of the motor 325. A first gear 326, a second gear 327, and a third gear 328 are rotatably attached to a shaft provided in the base member 321.

Figure 5A:
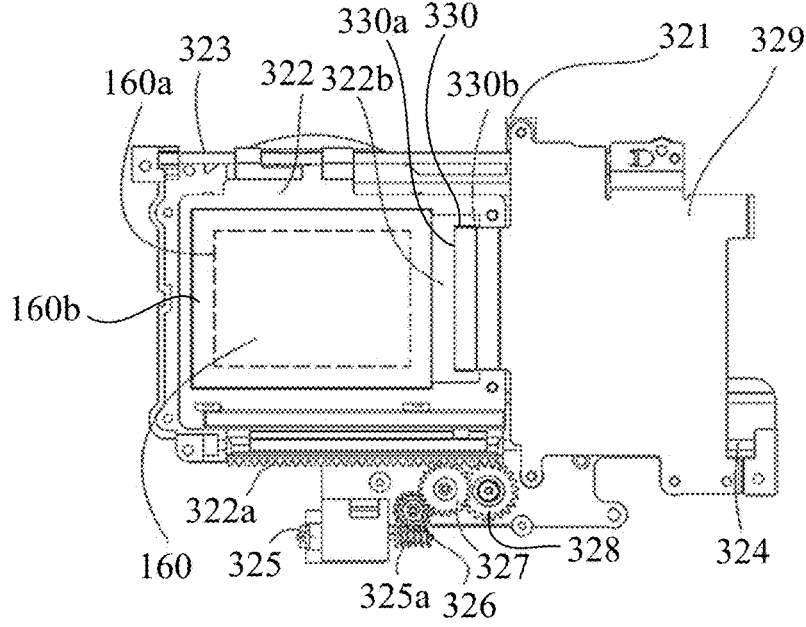
FIGS. 5A to 5C explain a state transition of the optical filter unit according to this embodiment.
Figure 5B:
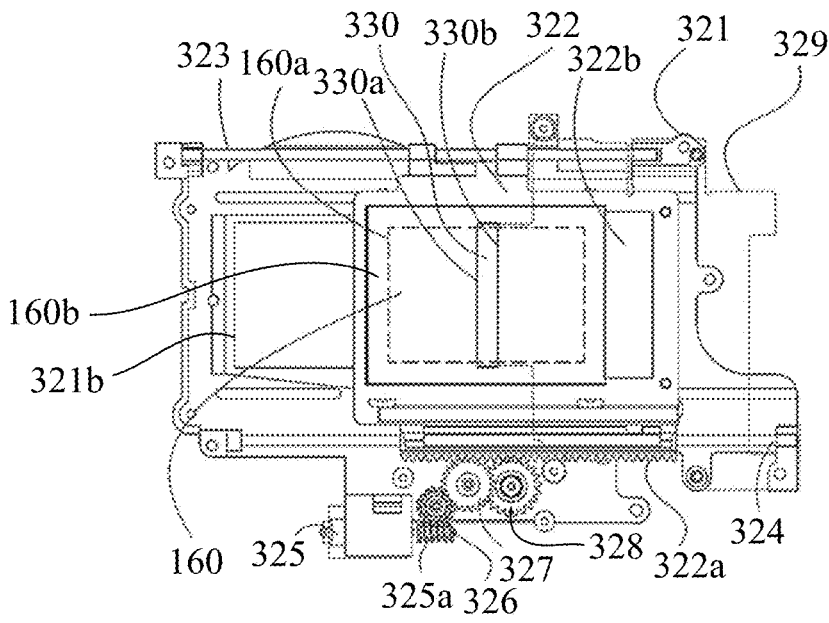
Figure 5C:
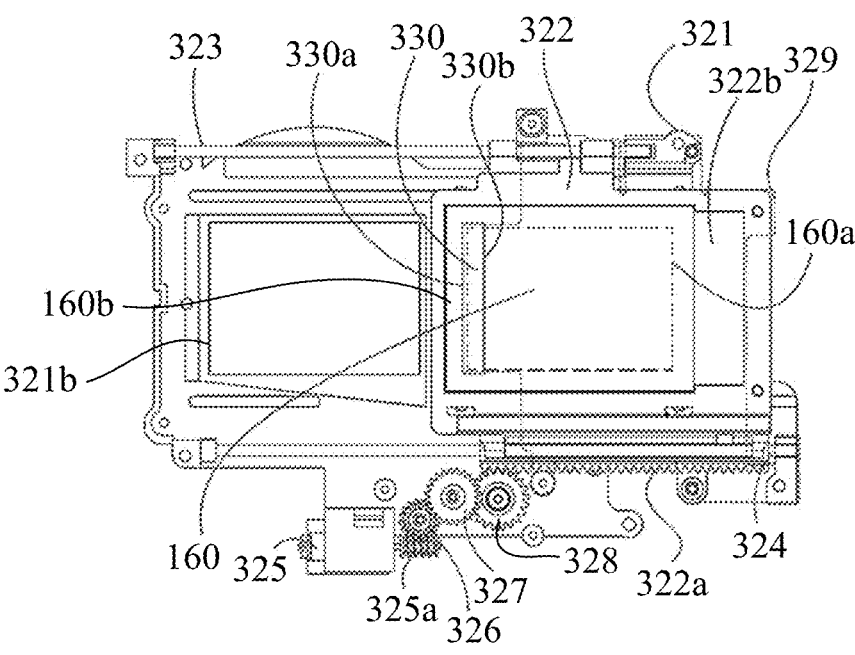

Referring now to FIGS. 5A to 5C, a description will be given of a state transition of the optical filter unit 320. FIGS. 5A to 5C explain the state transition of the optical filter unit 320. FIG. 5A illustrates an inserted state (used state, first position) where the optical filter 160 is inserted into an imaging optical path (imaging range). FIG. 5B illustrates a middle state (middle position) while the optical filter 160 is moving from the inserted state (first position) to a retracted state (second position). FIG. 5C illustrates the retracted state (unused state, second position) where the optical filter 160 is retracted from the imaging optical path. In this manner, the optical filter 160 can move between the first position inserted into the imaging range and the second position retracted from the imaging range by the motor 325.

In the inserted state of FIG. 5A, when the user presses down the multifunction button 113, the optical filter unit 320 starts moving so as to transition to the retracted state. A rotation of the motor 325 is transmitted to the rack gear forming portion 322*a* of the optical filter holder 322 through the first gear 326, the second gear 327, and the third gear 328. The optical filter 160 moves from the inserted state (FIG. 5A) via the middle state (FIG. 5B), and reaches the retracted state (FIG. 5C), while being guided by the upper portion rail 323 and the lower portion rail 324. The optical filter 160 that has reached the retracted state receives a detection signal of a position sensor (not illustrated) and stops.

In inserting the optical filter 160 again, the user presses down the multifunction button 113 in the retracted state illustrated in FIG. 5C. Thereby, the motor 325 rotates in a direction opposite to that of the above operation, and the optical filter 160 reaches the inserted state illustrated in FIG. 5A via the middle state illustrated in FIG. 5B. The optical filter 160 that has reached the inserted state receives the detection signal of the position sensor (not illustrated) and stops, similarly to the retracted state.

The above configuration can build the optical filter 160 in the image pickup apparatus 100 without increasing the size of the image pickup apparatus 100, and easily switch the inserted state and the retracted state of the optical filter 160.

A description will now be given of the elastic members 330 and 331 in this embodiment. An area inside the optical filter 160, that is, an area surrounded by dotted lines in FIGS. 5A to 5C is an effective area 160*a*. The effective area 160*a* is an area where an imaging light beam led by the focus lens 141 (see FIG. 2) passes in the inserted state of FIG. 5A, and corresponds to an area of the opening 321*b*. An area outside the dotted lines within the optical filter 160 is a non-effective area 160*b* where the imaging light beam does not pass. In other words, in a case where the optical filter 160 is located at the first position, the optical filter 160 has the effective area 160*a* which the imaging light enters, and the non-effective area 160*b* at least outside the effective area 160*a* and inside the optical filter 160, which the imaging light does not enter.

In the inserted state of FIG. 5A, the elastic member 330 and the elastic member 331 arranged on the opposite side of the elastic member 330 with the optical filter 160 sandwiched therebetween are in contact with the plane portions 322*b*, 322*c* (refer to FIG. 6C) of the optical filter holder 322, respectively. In the middle state of FIG. 5B, the elastic members 330 and 331 contact both surfaces of the optical filter 160, respectively. In other words, the elastic member 330 comes into contact with at least a portion of a first surface of the optical filter 160, in a case where the optical filter 160 moves from the first position to the second position, or in a case where the optical filter 160 moves from the second position to the first position. In the same manner, the elastic member 331 comes into contact with at least a portion of a second surface on an opposite side of the first surface of the optical filter 160, when the optical filter 160 moves from the first position to the second position, or when the optical filter 160 moves from the second position to the first position. This embodiment provides both of the elastic members 330 and 331, but is not limited to this example, and may provide at least one of the elastic members 330 and 331.

While the optical filter 160 is moving, foreign substances that may affect imaging such as dust, and the like, attached to the surface of the optical filter 160 are swept out by the elastic members 330 and 331. The foreign substances that have been swept out are accumulated at an end portion 330a of the elastic member 330 and an end portion 331a of the elastic member 331 (see FIGS. 6C and 6E). In the retracted state of FIG. 5C, the foreign substances accumulated at the end portions 330a and 331a of the elastic members 330 and 331 move to the outside of the effective area 160a.

In this embodiment, in the course of the optical filter 160 moving from the inserted state (FIG. 5A) to the retracted state (FIG. 5C), the elastic members 330 and 331 come into contact with an entire area corresponding to the effective area 160a of the optical filter 160, and move the foreign substances of the effective area 160a. In other words, while the optical filter 160 moves from the first position to the second position, or while the optical filter 160 moves from the second position to the first position, the elastic members 330 and 331 come into contact with the entire effective area 160a.

In the retracted state of FIG. 5C, the end portion 330a of the elastic member 330 has reached as far as the non-effective area 160b on an outer side in a moving direction of the effective area 160a of the optical filter 160 (area on the left side of the effective area 160a among the non-effective area 160b in FIG. 5C). In other words, in a case where the optical filter 160 is located at the second position, at least a portion of the elastic member 330 contacts the non-effective area 160b.

Therefore, foreign substances accumulated at the end portions 330a and 331a of the elastic members 330 and 331 can be moved to the outside of the effective area 160a of the optical filter 160. Similarly, in a case where the optical filter 160 moves from the retracted state of FIG. 5C to the inserted state of FIG. 5A, foreign substances attached to the optical filter 160 are accumulated at an end portion 330b of the elastic member 330 and an end portion 331b of the elastic member 331. The foreign substances can be moved to the outer side of the effective area 160a of the optical filter 160.

In this embodiment, each of the elastic members 330 and 331 has a substantially rectangular shape having a longitudinal direction in a direction perpendicular to the moving direction of the optical filter 160 (vertical direction in FIGS. 5A to 5C), however, this embodiment is not limited to this example, and each of the elastic members 330 and 331 may take other shapes.

Referring now to FIGS. 6A to 6E, a description will be given of a biasing relationship among the optical filter 160, the optical filter holder 322, and the elastic members 330 and 331. FIGS. 6A to 6C explain the biasing relationship among the optical filter 160, the optical filter holder 322, and the elastic members 330 and 331.

FIG. 6A illustrates the front cover 10, the optical filter 160, the optical filter holder 322, the media slot 172, and a main substrate 180 viewed from the rear surface side of the image pickup apparatus 100. FIG. 6B is a cross-sectional view taken along a line B-B in FIG. 6A, in a case where the optical filter 160 is in the inserted state. FIG. 6C is an enlarged view of a range illustrated by a circle C in FIG. 6B. FIG. 6D is a cross-sectional view along the line B-B in FIG. 6A, in a case where the optical filter 160 is in the retracted state. FIG. 6E is an enlarged view of a range illustrated by a circle E in FIG. 6D. As illustrated in FIGS. 6B and 6C, in the case where the optical filter 160 is in the inserted state, the elastic members 330 and 331 contact the plane portions 322b and 322c of the optical filter holder 322, respectively.

The plate spring member 329 biases the elastic member 330 in a direction toward the optical filter 160. The biasing force of the plate spring member 329 biases (forces) the optical filter holder 322 in a direction toward the elastic member 331. The elastic member 331 resists against the biasing force of the plate spring member 329, and pushes back the optical filter holder 322 in a direction of the optical filter 160. Thereby, this state is balanced.

As illustrated in FIG. 6D, in the state where the optical filter 160 is in the retracted state, the optical filter 160 is retracted to a position between the grip portion 101 and the media slot 172 or between the grip portion 101 and the main substrate 180. As illustrated in FIGS. 6D and 6E, in the retracted state, the elastic members 330 and 331 the optical filter 160.

The plate spring member 329 biases the elastic member 330 in the direction toward the optical filter 160. The elastic member 331 resists against the biasing force of the plate spring member 329, and pushes back the optical filter 160. Thereby, this state is balanced.

In this embodiment, vibration and noise that may occur when the optical filter 160 moves, such as motor noises and minute vibration by the gear engagements are transmitted to and absorbed by the elastic members 330 and 331 through the optical filter 160 or the optical filter holder 322. Thus, the vibration and noise that may occur when the optical filter 160 moves are hardly transmitted to the user of the image pickup apparatus 100.

This embodiment can provide an image pickup apparatus that can easily remove foreign substances attached to an optical filter that can switch a use state and a non-use state, without increasing the size of the image pickup apparatus.

While the disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2023-031901, which was filed on Mar. 2, 2023, and which is hereby incorporated by reference herein in its entirety.

What is claimed is:
1. An image pickup apparatus comprising:
an image sensor;
an optical filter;
a holder configured to hold the optical filter;
a driving unit configured to move the holder; and
a first elastic member disposed outside an imaging range, wherein the driving unit moves the optical filter between a first position inserted into the imaging range and a second position retracted from the imaging range, and wherein the first elastic member comes into contact with at least a portion of a first surface of the optical filter, in a case where the optical filter moves from the first position to the second position, or in a case where the optical filter moves from the second position to the first position.

2. The image pickup apparatus according to claim 1, wherein in a case where the optical filter is located at the first position, the optical filter includes an effective area which imaging light enters and a non-effective area that is located at least outside the effective area and inside the optical filter and which the imaging light does not enter, and wherein in a case where the optical filter is located at the second position, at least a portion of the first elastic member comes into contact with the non-effective area.

3. The image pickup apparatus according to claim 2, wherein the first elastic member comes into contact with an entire effective area while the optical filter moves from the first position to the second position, or while the optical filter moves from the second position to the first position.

4. The image pickup apparatus according to claim 1, further comprising a plate spring member configured to attach the first elastic member, Wherein the plate spring member biases the first elastic member in a direction toward the optical filter.

5. The image pickup apparatus according to claim 1, wherein the first elastic member has a rectangular shape having a longitudinal direction in a direction perpendicular to a moving direction of the optical filter.

6. The image pickup apparatus according to claim 1, further comprising a second elastic member disposed outside the imaging range, wherein the second elastic member comes into contact with at least a portion of a second surface on an opposite side of the first surface of the optical filter, in a case where the optical filter moves from the first position to the second position, or in a case where the optical filter moves from the second position to the first position.

7. The image pickup apparatus according to claim 6, wherein the second elastic member is disposed on an opposite side of the first elastic member with respect to the optical filter.

8. The image pickup apparatus according to claim 6, wherein the second elastic member has a rectangular shape having a longitudinal direction in a direction perpendicular to a moving direction of the optical filter.

9. The image pickup apparatus according to claim 1, further comprising a mount unit to which a lens unit is detachably attachable, wherein the optical filter is disposed between the image sensor and the mount unit.

10. The image pickup apparatus according to claim 9, wherein the imaging range is defined by an opening provided inside the mount unit.

11. The image pickup apparatus according to claim 1, wherein the optical filter is an ND filter, a PL filter, or a soft filter.

* * * * *